June 21, 1966  A. D. WILEY  3,256,724
METHOD AND APPARATUS FOR FORMING HELICAL, LOCK
SEAM OR WELDED PIPE
Filed May 7, 1963  2 Sheets-Sheet 1

INVENTOR.
ALLEN DALE WILEY,
BY
ATTORNEYS.

June 21, 1966  A. D. WILEY  3,256,724
METHOD AND APPARATUS FOR FORMING HELICAL, LOCK
SEAM OR WELDED PIPE
Filed May 7, 1963  2 Sheets-Sheet 2

INVENTOR.
ALLEN DALE WILEY,
BY
ATTORNEYS.

United States Patent Office 3,256,724
Patented June 21, 1966

3,256,724
METHOD AND APPARATUS FOR FORMING HELICAL, LOCK SEAM OR WELDED PIPE
Allen Dale Wiley, Middletown, Ohio, assignor to Armco Steel Corporation, Middletown, Ohio, a corporation of Ohio
Filed May 7, 1963, Ser. No. 278,559
7 Claims. (Cl. 72—136)

This invention relates to a method and apparatus for forming helical pipe from metallic strip and more particularly to the formation of large diameter pipe and the method and apparatus are particularly advantageous where the seam is a lock seam or where the weld is a lap weld.

Spirally wound pipe has conventionally been produced by means of forming shells into which a metal strip is fed at an angle and the forming shells force the strip into a spiral or helical convolution. This has been true with smooth wall pipe as well as with helically corrugated pipe and it has been true whether the seam between adjacent convolutions is a lock seam or a weld seam.

With forming shells, it will be understood that a different forming shell must be provided for each different pipe diameter. This represents a rather large capital investment with many different sizes of pipe to be formed. This is particularly true in the case of shells for large diameter pipe which becomes very cumbersome and expensive. By "large diameter pipe" is meant pipe having a diameter of six inches up to eight feet. The wall thickness will vary depending on type and size of pipe but will generally be between 18 gauge and one-half inch.

Furthermore, where lap seam pipe or lock seam pipe is produced (both of which involve the over-lapping of an edge of one convolution with respect to the adjacent edge of another convolution), and it is attempted to do this without a forming shell, there is a tendency for the pipe to grow in diameter. The tendency is for the pipe to grow in radius by the thickness of the metal for each convolution formed. Thus, the exiting end of the pipe will be several inches larger in diameter than the beginning end of the pipe.

With the foregoing considerations in mind, it is an object of the present invention to eliminate the foregoing disadvantages and problems by free forming the pipe by means of a three roll bending apparatus and then controlling the diameter of the convolutions by means of a flexible element of predetermined length helically embracing the first convolution of the formed pipe to restrict the diameter and prevent growth in diameter. It is an ancillary object of the invention, therefore, to provide an apparatus for forming helically or spirally convoluted pipe which will be very much cheaper in capital investment than presently used types of pipe machines and which will be very much more universal in that a large number of pipe diameters can be made with very little additional capital investment.

These and other objects of the invention which will be described in more detail hereinafter or which will be apparent to one skilled in the art upon reading these specifications, are accomplished by that certain series of method steps and by that certain construction and arrangement of parts of which the following will describe an exemplary embodiment.

Reference is made to the drawings forming a part hereof and in which.

Figure 1:
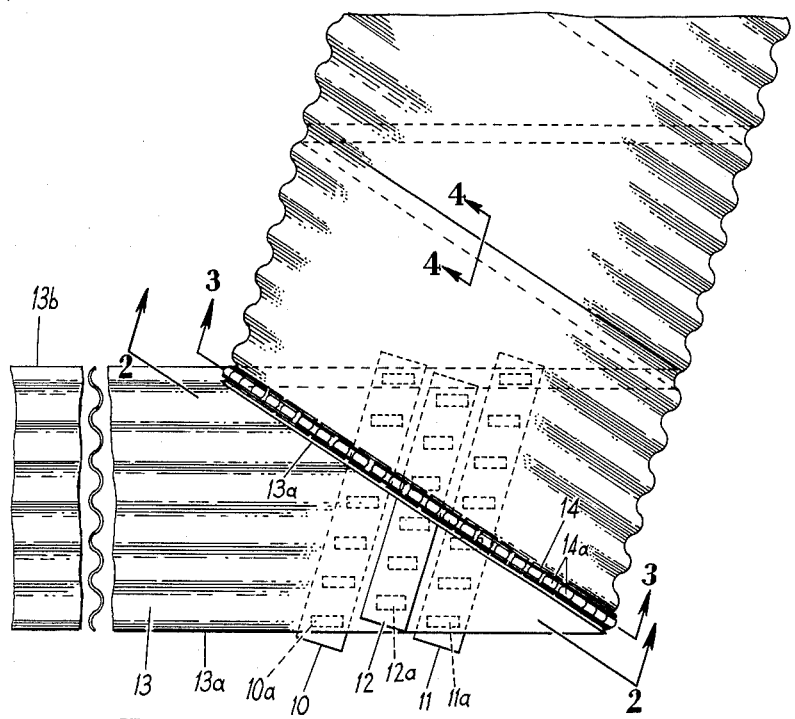
FIG. 1 is a somewhat diagrammatic plan view with a portion of the incoming strip shown in cross-section showing the formation of pipe according to the present invention.
Figure 2:
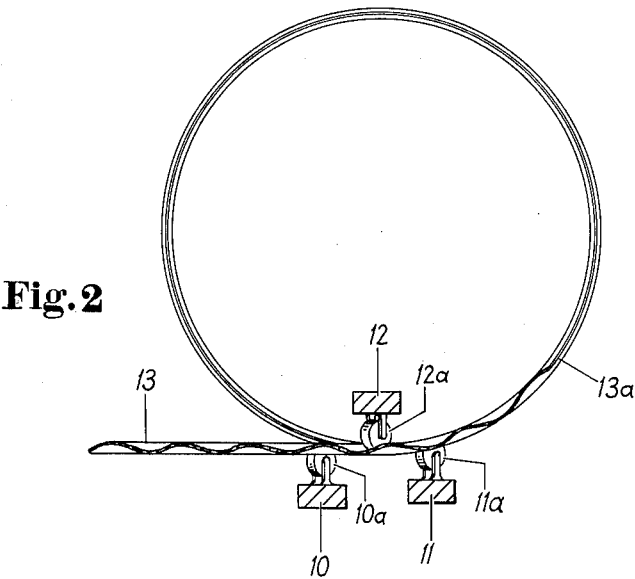
FIG. 2 is a cross-sectional view taken on the line 2—2 of FIG. 1.

Briefly, in the practice of the invention a strip of metal is fed at an angle into a three roll bending apparatus well known in the pipe manufacturing industry. Such apparatus comprises a heel roll, a knee roll and a buttress roll, two of these rolls being on one side of the strip and the other being on the other side of the strip between the first two. When strip is fed into such an arrangement, the strip is given a curl in that direction corresponding to the position of the single roll and away from the two rolls. If the three roll bending apparatus is disposed at right angles to movement of the strip, the strip will be formed substantially into a circle. According to the present invention, the three roll bending apparatus is disposed at an angle of more than 90° to the direction of strip travel so that the strip is free formed into a helical configuration. The particular angle must be related in terms of strip width and pipe diameter so that the outer edge of the strip will meet the inner edge in a desired relationship when the first complete convolution has been formed. According to the present invention, the pipe diameter is controlled by means of a flexible element securely anchored at its ends and embracing the free form first convolution adjacent the outside edge of the strip. In this way, growth of pipe diameter is prevented.

While applicant does not wish to be bound by the theory herein expressed, it is believed that the successful production of constant diameter lap or lock seam pipe, according to applicant's teachings, results from localized plastic deformation along the seam produced by the said flexible element in resisting the tendency of the pipe to increase in diameter. The inner layer of the lap or lock seam must be plastically compressed, while the outer layer must be plastically stretched, in such manner that the centerline of the seam follows a constant diameter helix. Thus the flexible element produces a localized effect on the seam, where the problem of diameter growth has its origin, while having a negligible effect over the major portion of the strip.

Referring in more detail to the drawings, a three roll bending apparatus is diagrammatically illustrated and comprises the heel roll 10, the buttress roll 11 and the knee roll 12. The rolls 10 and 11 are disposed beneath the strip and the roll 12 above the strip to cause the strip to curl upwardly.

It will be understood that if the strip is flat strip, the members 10, 11 and 12 will be cylindrical rolls. However, by way of illustration there has been shown a corrugated strip and in this event the members 10, 11 and 12 will comprise blocks in which are mounted a plurality of rollers 10a, 11a and 12a. These rollers, as will be pointed out hereinafter, are adjustable so that they may accommodate different pipe diameter which would necessitate a change in their angular disposition and in their spacing.

A corrugated strip 13 is shown being fed by suitable means, not forming a part of the present invention and therefore not illustrated, into the three roll bending apparatus just described and being thereby formed into a helical convolution. Hereinafter the edge of the strip indicated at 13a will be referred to as the outside edge and the edge indicated at 13b will be referred to as the inside edge of the strip. The angular disposition of the members 10, 11 and 12 and the rollers 10a, 11a and 12a will be determined by the width of the strip 13 and the diameter of pipe which it is desired to make. It will be observed that the edge 13a eventually, at the end of the first convolution, will be disposed adjacent the edge 13b and the edges 13a and 13b may be brought into abutting relationship or overlapping relationship depending upon the type of joint it is desired to produce. It will be understood that if it is desired to make lock seam pipe, the edges 13a and 13b will have been provided with cooperating edge configurations such as are shown, for example, in the Freeze Patent No. 2,136,943, of November 15, 1938.

Figure 3:
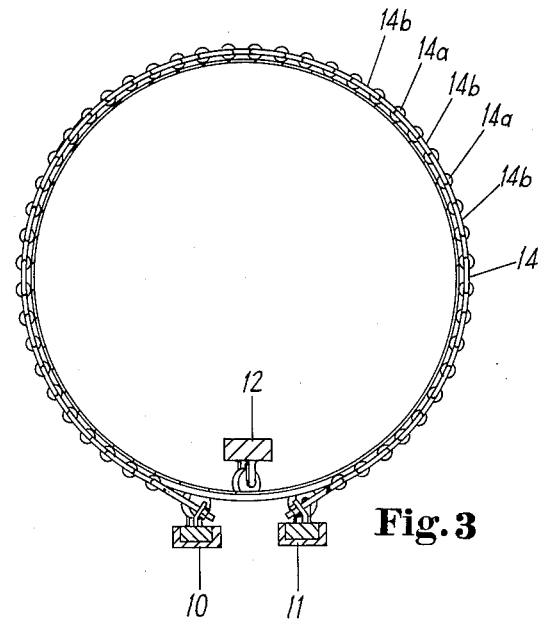
FIG. 3 is a cross-sectional view taken on the line 3—3 of FIG. 1.

In order to prevent the pipe diameter from growing and to rigidly control the diameter of the formed pipe, there is provided an encircling member 14 best seen in FIGS. 1 and 3. This encircling member may take the the form of a flexible cable or chain or a chain provided with rollers as illustrated in the drawings. A plurality of small rollers 14a are provided at the joints between adjacent links 14b which constitute the member 14. It will be understood that these rolls may be configured to the shape of the corrugations, or a pair of rolls may be provided to ride in two adjacent grooves for greater ease in positioning the encircling member 14. The two ends of the flexible element 14 will be firmly anchored as best seen in FIG. 6 to the members 10 and 11. Thus, the end links may be in the form of Y's 14c terminating in a threaded shank 14b passing through a lug 10b and held in position by means of a nut 14e. For different size of pipe, different lengths of elements 14 may be provided and fine adjustment may be achieved by means of the nuts 14e. The flexible element 14 embraces the helically formed pipe adjacent the outer edge of the first convolution as best seen in FIG. 1, and it prevents growth of the pipe diameter.

Figure 5:
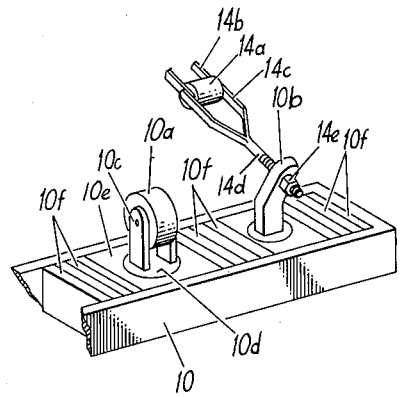
FIG. 5 is a fragmentary perspective view of one of the elements of the three roll bending apparatus showing the anchoring of one end of the flexible element.

When it is necessary to adjust the members 10, 11 and 12 in order to produce different sizes of pipe, the rollers 10a, 11a and 12a must be capable of adjustment angularly and spatially along the members 10, 11 and 12 respectively. This can be accomplished as best seen in FIG. 5 by virtue of the fact that the rollers, as for example the roller 10a, are mounted on trunnions 10c secured to or integral with a cylindrical member 10d which is rotatable about a vertical axis in a block 10e which is slidable longitudinally in a recess in the member 10. Spacer blocks 10f may be removed and added as required to adjust the spacing of the rollers 10a longitudinally of the member 10.

Figure 4:
FIG. 4 is a fragmentary cross-sectional view on an enlarged scale taken on the line 4—4 of FIG. 1 showing a lap seam.

The means for compressing a lock seam and, if desired, welding the seam and the means for welding a lap seam such as is shown in FIG. 4, have not been shown because these may be in all respects conventional and they do not form any part of the present invention.

It will be understood that numerous modifications may be made without departing from the spirit of the invention and therefore no limitation is intended other than as set forth in the claims.

What is claimed is:
1. The method of free-forming spiral pipe, which includes the steps of moving a strip of metal longitudinally through a bender disposed at an angle of more than 90° to the path of the centerline of said strip, whereby to impart to said strip a helical configuration such that after the first helical convolution has been formed the outer edge of said convolution is juxtaposed to the inside edge of the incoming strip, and maintaining constant the diameter of the formed pipe by maintaining constant the length of the helix formed by the said outer edge during said first helical convolution, by helically disposing an inextensible flexible element independent of said bender, secured only at both its ends, along the said outer edge of said first helical convolution being formed.

2. The method of claim 1, wherein said strip is longitudinally corrugated and wherein said flexible element is disposed in the first groove of the corrugations along the outside edge of the first convolution.

3. The method of claim 1, wherein the juxtaposed edges are in overlapping relation.

4. Apparatus for free-forming spiral pipe comprising a bending apparatus through which a strip of metal is fed longitudinally, said apparatus being disposed at an angle of more than 90° to the centerline of said strip, said bending apparatus imparting to said strip a helical configuration, inextensible flexible means independent of said bending means anchored at both ends only and embracing the first convolution of said strip along its outside edge to fix and maintain the diameter of the formed pipe.

5. Apparatus according to claim 4, wherein said flexible means comprises a chain carrying a plurality of rollers for contacting the strip convolution.

6. Apparatus according to claim 4 for forming helically corrugated pipe, wherein said bending apparatus comprises blocks disposed parallel to the formed pipe, each of said blocks carrying a plurality of rollers adapted to engage the grooves between adjacent corrugations.

7. Apparatus according to claim 6, wherein the rollers are mounted respectively in each of said blocks for adjustment longitudinally of the blocks and for the angularity of their axes with respect to the blocks.

References Cited by the Examiner
UNITED STATES PATENTS

| | | | |
|---|---|---|---|
| 1,774,000 | 8/1930 | Hand | 228—17 |
| 1,939,581 | 12/1933 | Tesmer | 228—15 |
| 2,282,176 | 5/1942 | Fay et al. | 72—50 |

References Cited by the Applicant
FOREIGN PATENTS

| | | |
|---|---|---|
| 896,188 | 5/1962 | Great Britain. |

CHARLES W. LANHAM, *Primary Examiner.*

R. D. GREFE, *Assistant Examiner.*